United States Patent [19] [11] 4,064,543
Phillips et al. [45] Dec. 20, 1977

[54] ELECTRON BEAM EQUIPMENT

[75] Inventors: Peter Harold Phillips, Fareham; David William Warwick, Southampton, both of England

[73] Assignee: Plessey Handel und Investments A.G., Zug, Switzerland

[21] Appl. No.: 676,495

[22] Filed: Apr. 13, 1976

[30] Foreign Application Priority Data

Apr. 16, 1975 United Kingdom ............... 15559/75

[51] Int. Cl.[2] ............................................ H04N 5/645
[52] U.S. Cl. ...................................................... 358/248
[58] Field of Search ........................................... 358/248

[56] References Cited

U.S. PATENT DOCUMENTS

| | | | |
|---|---|---|---|
| 3,582,848 | 6/1971 | Ryder et al. | 358/248 |
| 3,861,233 | 1/1975 | Miyamoto et al. | 358/248 |

*Primary Examiner*—Richard Murray
*Attorney, Agent, or Firm*—Fleit & Jacobson

[57] ABSTRACT

A mounting arrangement for mounting scanning coil-/yoke structures on the neck of an electron beam tube comprises in addition to position adjustment means for producing lateral displacement of the scanning coil-/yoke structure on the neck of an electron beam tube along two mutually perpendicular axes as well as axial displacement of the structure along the tube neck, tilt adjusting means for producing tilt of the coil with respect to the axis of the tube neck and constructed and arranged to afford simultaneous lateral displacement and tilt of the coil structure relative to the tube neck axis to afford optimum convergence control taking into account mechanical limitations imposed by the tube neck on which the scanning coil is mounted.

7 Claims, 4 Drawing Figures

ELECTRON BEAM EQUIPMENT

This invention relates to electron beam equipment (e.g. cathode-ray tube assemblies) and relates more specifically to mounting arrangements in such assemblies for mounting scanning coil/yoke structures on the neck of an electron beam tube.

It is known in mounting arrangements for use in electron beam equipment (e.g. cathode-ray tube assemblies) to mount scanning coil/yoke structures on the neck of an electron beam tube, for the mounting arrangement to include means operable to provide lateral displacement of the scanning coil/yoke structure along mutually perpendicular axes corresponding to the usual "X" and "Y" axes of the tube screen.

It is also known for axial movement of the scanning coil/yoke structure to be provided for with the facility of tilting the coil relative to the axis of the tube neck.

The present invention is directed to an improved mounting arrangement for the purpose referred to comprising, in addition to position adjustment means for producing lateral displacement of the scanning coil/yoke structure on the neck of an electron beam tube along two mutually perpendicular axes as well as axial displacement of the structure along the tube neck, tilt adjusting means for producing tilt of the coil with respect to the axis of the tube neck and constructed and arranged to afford simultaneous lateral displacement and tilt of the coil structure relative to the tube neck axis to afford optimum convergence control taking into account mechanical limitations imposed by the tube neck on which the scanning coil is mounted.

The tilt adjustment means preferably takes the form of a tilt ring structure having internal peripheral cam tracks co-operable with surfaces on the scanning coil/yoke structure, preferably pivotally mounted on a further ring structure against which the tilt ring structure abuts, to effect tilting of the coil in response to relative rotation between the tilt ring structure and said further ring structure. The cam tracks on the tilt ring structure which follow generally helical paths are tapered so that the centre of the scanning coil/yoke structure is displaced laterally relative to the tube axis as well as being tilted in response to rotation of the tilt ring.

For the purpose of positively locating the scanning coil mounting arrangement on the neck of the tube such arrangement may be attached to a so-called funnel ring structure bonded to the tube funnel or the scanning coil mounting arrangement may alternatively be attached to a frame structure which may be clamped to the neck of the tube or which may be held fast between the tube funnel and an annular electron beam bender device clamped to the tube neck. In the latter case the frame structure conveniently embodies screw adjustable pads or feet which can be displaced in order to take up free movement between the frame structure and the tube funnel and the beam bender.

By way of example the present invention will now be described with reference to the accompanying drawings in which.

Figure 1:
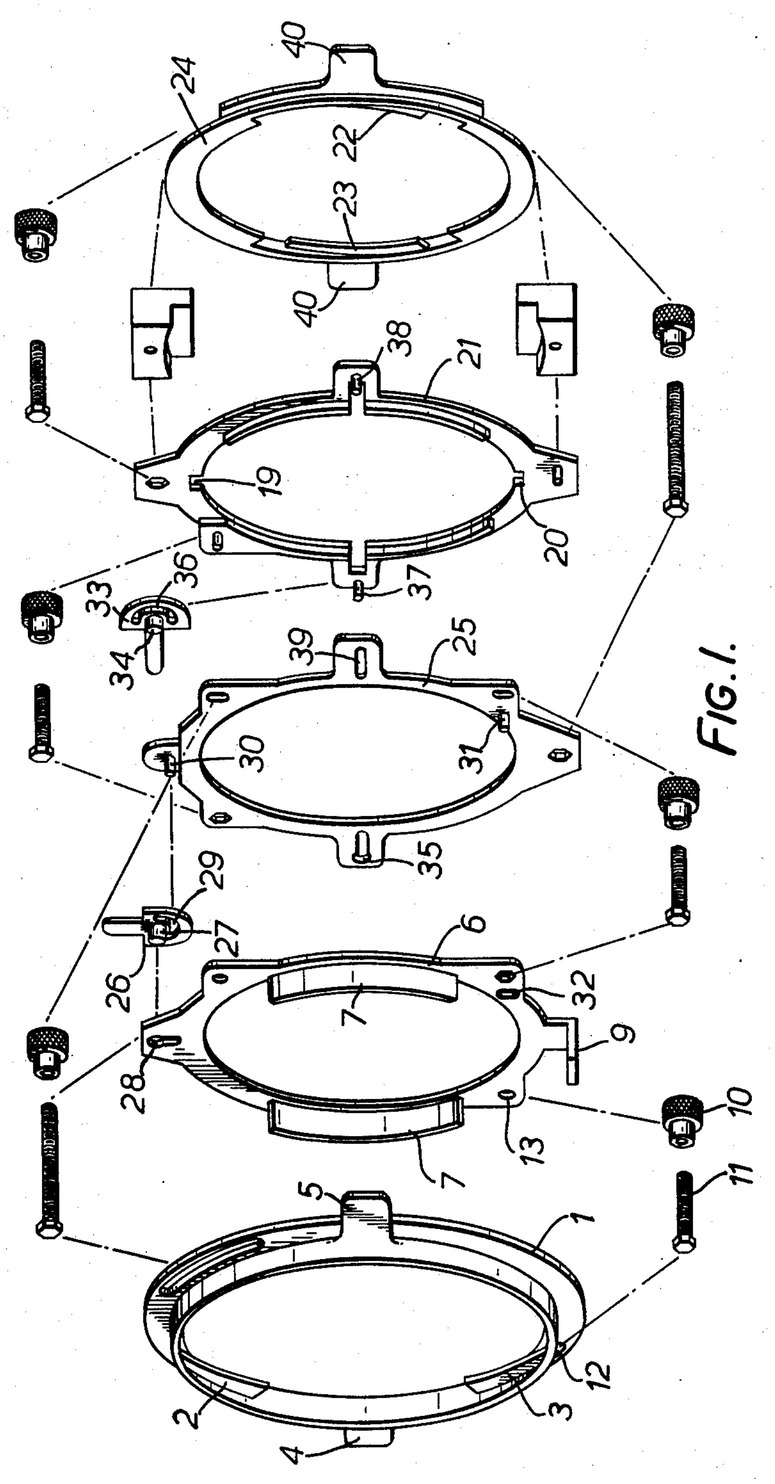
FIG. 1 shows an exploded view of a scanning coil mounting arrangement according to the present invention.
Figure 3:
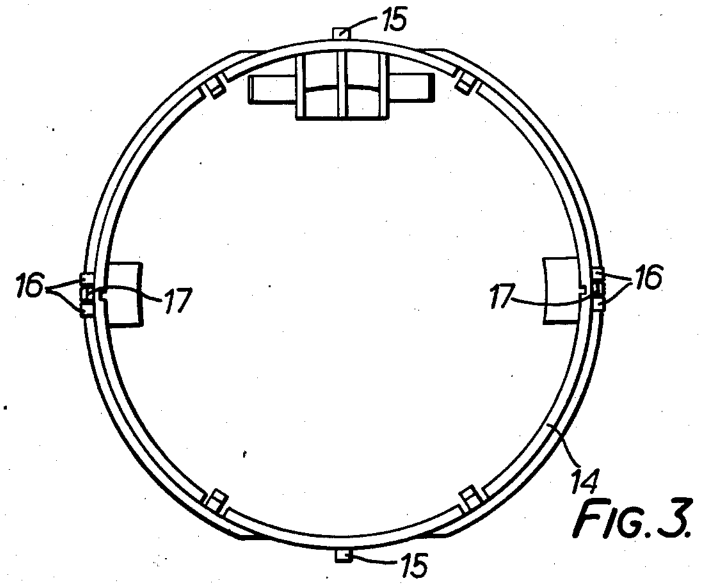
Figure 4:
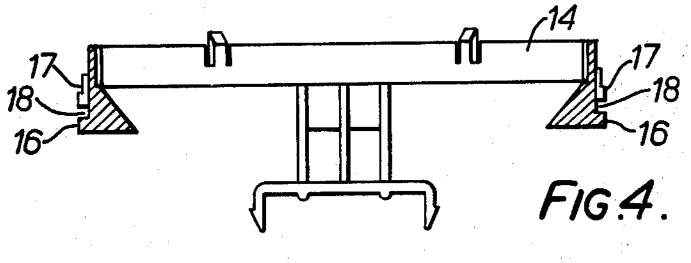

Referring to FIG. 1 of the accompanying drawings, this shows the scanning coil mounting arrangement in exploded form so that the various ring structures of the arrangement can be seen more clearly and their respective functions more readily understood from the following description. It may here be mentioned that the scanning coil/yoke structure to be mounted by means of the mounting arrangement depicted in the drawings comprises a generally frusto-conical hollow ferrite yoke fitted with slotted end rings of moulded plastics construction and embraced by the turns of the scanning coil which are received in locating slots of the end ring structures. The larger end of the scanning coil structure may have secured to it the moulded head ring shown in FIGS. 3 and 4 including means facilitating the mounting of the scanning coil/yoke structure in the mounting arrangement to be described.

It is convenient to consider the arrangement of FIG. 1 from left to right in describing the constructional features and purpose of the various ring structures, all of which may conveniently be of plastics-moulded construction and which will be located over the neck of the cathode-ray tube. At the extreme left of FIG. 1 there is shown ring structure 1 which may be rotatably mounted on a funnel ring structure (not shown) bonded, usually by the tube manufacturers, to the funnel part of a cathode-ray tube closely adjacent the neck of the tube. The rotatable mounting of the ring structure 1 on the funnel ring is conveniently achieved by arranging that generally helical cam tracks 2 and 3 on the inner periphery of the ring structure 1 locate between pairs of spaced pegs moulded integrally with the funnel ring structure. As will readily be appreciated from the drawing angular adjustment of the ring structure 1 relative to the funnel ring which may be facilitated by the provision of integrally moulded actuator lugs 4 and 5 causes the ring structure 1 to move relative to the funnel ring in the axial direction of the tube neck. The ring structure 1 accordingly provides for movement of the scanning coil/yoke structure in a direction corresponding to the "Z" axis of the tube screen. Co-operating with the ring structure 1 is a ring structure 6 provided with axially extending arcuate wall parts 7 and 8 which engage with the inner peripheral surface of the ring structure 1 between the ends of the cam tracks 2 and 3 to facilitate limited relative rotation (e.g. 3°) between the ring structure 1 and 6, such rotation conveniently being facilitated by forming the ring structure 6 with an integral actuator lug 9 which extends outwardly beyond the assembly. After angular adjustment of the ring 6 relative to the ring 1 has been made the ring structures may be locked together provisionally by tightening knurled nut 10 on bolt 11 which extends through an arcuate slot 12 in the ring structure 1 and hole 13 in the ring structure 6.

At this juncture it is convenient to refer to the mounting of the scanning coil/yoke structure arrangement. As previously mentioned the scanning coil/yoke structure is fitted with a plastics-moulded head ring shown in FIG. 3 of the drawings to which attention is now directed. By referring to FIG. 3 of the drawings, it will be seen that the head ring indicated at 14 is formed with diametrically opposed pegs or pins 15 and perpendicularly thereto Projections 16 and 17 are provided which define slots 18 therebetween, as can best be seen in FIG.

4. If reference is now also made to FIG. 1 it will be appreciated how pegs 15 of the scanning coil/yoke head ring 14 may be located in diametrically opposed slots 19 and 20 of ring structure 21 and also how helical cam tracks 22 and 23 of tilt ring structure 24 may be received by the slots 18 between the projections 16 and 17 of the head ring when ring structures 21, 22 and 24 abut against one another.

Reverting now to FIG. 1 it will be remembered that ring structure 6 was provisionally locked to ring structure 1. In order to produce vertical lateral displacement of the scanning coil/yoke structure relative to the tube axis, vertical displacement of ring structures 25, 21 and 24, which support the scanning coil/yoke structure relative to the ring structure 6, is required. This displacement is achieved by providing a cam position adjuster 26 which has a pivot pin 27 locating in keyhole slot 28 and a curved cam slot 29 which receives cam follower pin 30 on ring structure 25. The ring structure 25 also includes pin 31 received by vertically elongated hole 32 in ring structure 6. As will be appreciated from the drawing, rotation of the cam adjuster 26 will produce relative displacement in the vertical direction between the two ring structures 6 and 25. Since the ring structure 6 is fixed relative to the tube neck as regards vertical displacement the ring structure 25 and thus rings 21, 24 and the scanning coil/yoke structure will be displaced vertically relative to the tube axis. This displacement corresponds to "Y" axis adjustment on the tube screen.

Lateral displacement of the ring structure 21 and the scanning coil/yoke structure in the horizontal direction relative to the ring structure 25 is provided by adjustment of cam adjuster 33 similar to the cam adjuster 26. This cam adjuster 33 pivots on pin 34 which locates in a keyhole slot 35 in ring structure 25 and embodies curved cam slot 36 which receives cam follower pin 37 integral with ring structure 21. Ring structure 21 also has pin 38 engaging horizontally elongated hole 39 in ring structure 25. Rotation of the cam adjuster 33 facilitated by integral actuator lever causes horizontal displacement of the ring 21 and of the scanning coil/yoke structure relative to the ring structure 25 which is fixed relative to the tube neck as regards horizontal displacement. Such horizontal displacement corresponds with "X" axis adjustment on the tube screen.

Figure 2:
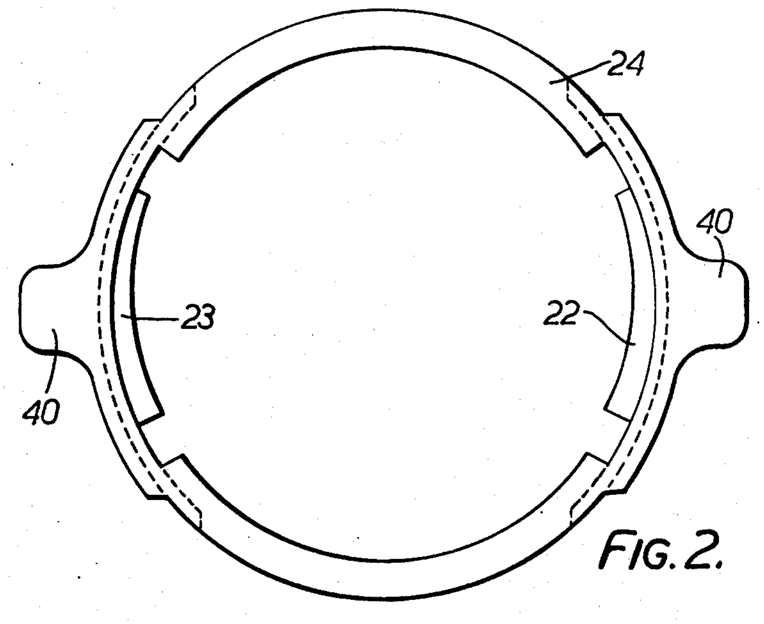
FIG. 2 shows a plan view of a tilt ring structure of the mounting arrangement according to FIG. 1; and, FIGS. 3 and 4 show plan and cross-sectional views respectively of a moulded head ring forming part of the scanning coil/yoke structure.

Thus far it can be seen how axial (Z), vertical ("Y") and horizontal ("X") movements as well as small rotational movement may be imparted to the scanning coil-/yoke structure. For the purpose of providing tilt of the scanning coil/yoke structure the previously referred to tilt ring structure 24 may be rotated so that the helical cam tracks 22 and 23 locating in slots 18 in the head ring 14 (FIG. 4) of the scanning coil/yoke structure cause tilting about the vertical axis through pins 15 of ring 14, rotation of the ring 24 being facilitated by provision of actuator lugs 40. By referring to FIG. 2 which shows the tilt ring structure 24 in plan, it can be seen that the generally helical cam tracks 22 and 23 are tapered, the effect of which is to shift the effective centre of the ring 24 as the ring is rotated so that the scanning coil/yoke structure is not only tilted about its vertical axis but the coil is also displaced laterally relative to the tube neck axis. This lateral displacement of the scanning coil/yoke structure serves to prevent the tail end of the structure being physically obstructed by the tube neck and also provides the best convergence control consistent with mechanical restrictions.

As will readily be appreciated the various ring structures of the mounting arrangement may be provisionally and finally locked together after various adjustments are made, and for this purpose as indicated in FIG. 1 several locking nuts and bolts are provided similar to the nut and bolt 10 and 11 effective for locking the ring structures 1 and 6 together.

Although in the specific embodiment described it has been assumed that the ring structure 1 is attached to a funnel ring bonded to the tube funnel, it will be understood that the attachment could be to a frame structure which is clamped to or otherwise fixedly secured over the neck of the tube as previously described. Such a frame structure may conveniently be moulded from plastics material.

What we claim is:

1. A mounting arrangement for mounting scanning coil/yoke structures on the neck of an electron beam tube comprising position adjustment means for producing lateral displacement of the scanning coil/yoke structure on the neck of the electron beam tube along two mutually perpendicular axes as well as axial displacement of the structure along the tube neck and tilt adjusting means for producing tilt of the coil with respect to the axis of the tube neck and constructed and arranged to afford simultaneous lateral displacement and tilt of the coil structure relative to the tube neck axis to afford optimum convergence control taking into account mechanical limitations imposed by the tube neck on which the scanning coil is mounted, wherein said tilt adjustment means comprises a tilt ring structure having internal peripheral cam tracks co-operable with surfaces on the scanning coil/yoke structure to effect tilting of the coil in response to relative rotation between the tilt ring structure and the scanning coil/yoke structure.

2. A mounting arrangement as claimed in claim 1, in which the scanning coil/yoke structure is pivotally mounted on a further ring structure against which the tilt ring structure abuts.

3. A mounting arrangement as claimed in claim 1, in which the cam tracks on the tilt ring structure which follow generally helical paths are tapered so that the centre of the scanning coil/yoke structure is displaced laterally relative to the tube axis as well as being tilted in response to rotation of the tilt ring.

4. A mounting arrangement for mounting scanning coil/yoke structures on the neck of an electron beam tube comprising position adjustment means for producing lateral displacement of the scanning coil/yoke structure on the neck of the electron beam tube along two mutually perpendicular axes and for producing axial displacement of the structure along the tube neck and tilt adjusting means for producing tilt of the coil with respect to the axis of the tube neck and tilt of the coil-/yoke structure relative to the tube neck axis with simultaneous compensating lateral displacement of a rear end of the coil/yoke structure for maintaining the center point of said rear end constant with respect to the axis of the tube neck independently of the tilting action.

5. A mounting arrangement as claimed in claim 4, including locating means for positively locating said arrangement on the neck of the tube and comprising a funnel ring structure bonded to the flared part of the electron beam tube.

6. A mounting arrangement as claimed in claim 4, including locating means for positively locating said arrangement on the neck of the tube and comprising a frame structure to which said arrangement is attached and which is clamped to the neck of the tube and an annular electron beam bender device clamped to the tube neck.

7. A mounting arrangement as claimed in claim 6, in which the frame structure embodies screw adjustable pads which can be displaced in order to take up free movement between the frame structure and the flared part of the tube and beam bender.

* * * * *